United States Patent
Beckman et al.

(10) Patent No.: US 10,087,740 B2
(45) Date of Patent: Oct. 2, 2018

(54) CALIPER TOOL WITH CONSTANT CURRENT DRIVE

(71) Applicant: PROBE HOLDINGS, INC., Fort Worth, TX (US)

(72) Inventors: Marvin Beckman, Mineral Wells, TX (US); Thientu Ho, Arlington, TX (US)

(73) Assignee: PROBE TECHNOLOGY SERVICES, INC., Fort Worth, TX (US)

( * ) Notice: Subject to any disclaimer, the term of this patent is extended or adjusted under 35 U.S.C. 154(b) by 0 days.

(21) Appl. No.: 15/140,624

(22) Filed: Apr. 28, 2016

(65) Prior Publication Data
US 2017/0167244 A1    Jun. 15, 2017

Related U.S. Application Data

(60) Provisional application No. 62/264,909, filed on Dec. 9, 2015.

(51) Int. Cl.
*G01B 7/14* (2006.01)
*G01B 7/30* (2006.01)
(Continued)

(52) U.S. Cl.
CPC ............ *E21B 47/0006* (2013.01); *G01V 3/28* (2013.01)

(58) Field of Classification Search
CPC .... G01B 7/14; G01B 7/30; H01F 5/00; H01F 21/06; H01F 7/06; G01R 35/00;
(Continued)

(56) References Cited

U.S. PATENT DOCUMENTS 6,605,940 B1 * 8/2003 Tabrizi ............... G01D 5/2291
324/207.18
7,276,897 B2 * 10/2007 Lee ..................... G01D 5/2053
324/207.17
(Continued)

FOREIGN PATENT DOCUMENTS

DE    3727265 A1    2/1989
EP    0992765    * 4/2000 ............... G01B 7/00
(Continued)

OTHER PUBLICATIONS

PCT International Search Report and Written Opinion dated Feb. 28, 2017, for International Patent Application No. PCT/US2016/063808.

*Primary Examiner* — Neel Shah
(74) *Attorney, Agent, or Firm* — Patterson & Sheridan, LLP

(57) ABSTRACT

A tool for evaluating the internal surfaces of tubular is provided, wherein one or more arms extend outwardly from the tool into contact with an inner wall of the tubular, and changes in the dimensions or condition of the inner wall result in changes in the position of the ends of the arms relative to the tool. This motion is converted, through an electromagnetic transducer, into an electrical signal, the amplitude of which falls is maintained as the temperature of the tool changes. In one aspect, the transducer includes a coil and a moveable metal or magnetic element. The coil is powered by a constant current source, and variations in the resistance of the electrical components of the transducer resultingly do not cause fall off of the output signal amplitude.

14 Claims, 12 Drawing Sheets

(51) Int. Cl.
*G01R 35/00* (2006.01)
*G01R 15/18* (2006.01)
*G01V 3/30* (2006.01)
*E21B 47/00* (2012.01)
*G01V 3/28* (2006.01)

(58) Field of Classification Search
CPC ........ G01R 15/18; G01R 15/183; G01V 3/30; E21B 47/082
USPC ............ 324/207.11, 207.15, 207.16, 207.17, 324/207.18, 207.19, 207.23, 207.24, 333, 324/346; 336/45, 130, 136, 170, 182, 336/192, 221; 340/870.35, 870.36; 318/653, 657
See application file for complete search history.

(56) References Cited

U.S. PATENT DOCUMENTS

2004/0080313 A1\* 4/2004 Brosh .................. G01D 5/2291
  324/207.18
2012/0091212 A1\* 4/2012 Guilhamat ................ F03G 7/06
  236/34.5

FOREIGN PATENT DOCUMENTS

| EP | 0992765 A1 | 4/2000 |
| GB | 2107886 A | 5/1983 |

\* cited by examiner

CALIPER TOOL WITH CONSTANT CURRENT DRIVE

BACKGROUND OF THE INVENTION

Field of the Invention

The present disclosure relates to the field of property measurement under conditions where the temperatures to which the measurement device is exposed otherwise cause falloff in the signal indicative of the measured property. More particularly, the present disclosure relates to physical measurement in remote environments, in which a measuring tool is passed through an item to be measured, and the temperatures to which the measuring tool is exposed vary. In one aspect, the measurement device is configured to determine the condition of the inner surfaces of tubulars, for example piping carrying fluids, including well bore tubulars, wherein the condition of the tubular is determined by passing a multi-arm caliper device through the tubular, and the condition of the tubular is inferred from the measurement data received from the multi arm caliper.

Description of the Related Art

Multi-arm caliper tools are widely used to evaluate the interior condition of tubular, such as piping, as well as in the field of cased hole wireline logging in order to determine the geometrical properties of the inner surface of tubulars such as casing, liners or tubings. Multi-arm calipers are provided with a plurality of caliper arms extending around a longitudinal centerline or axis of the tool, such that radii extending from the centerline of the tool to the adjacent tubular inner surface may be measured at a plurality of angular locations around the tool longitudinal axis at a relatively high frequency using caliper arms extending from the body of the tool, and these measurements are recorded in the tool and/or transmitted along a wireline to a remote location for recording or analysis. The data is used to assess the integrity of interior surface or wall the tubular, and can be used to locate areas of wall erosion, kinks, abnormal bending, or other geometrical physical indicia of impending loss of the fluid sealing integrity of the tubular. If the tool data indicates an issue with the integrity of the wall or inner surface of the tubular, the owner or operator of the equipment or well in which the tubular is used can take remedial steps, such as locating a liner over the location of the tubular in which there is an integrity issue, replacing the tubular (such as where a secondary tubing was extended into, but not cemented into place, in a well bore, or the tubular is in process equipment and can be accesses for replacement) or sealing off the location in the tubular where the integrity issue is present. Where the tubular is a casing or liner permanently fixed in a well bore, and the well is still producing, the owner or operator of the well will need to determine whether the cost of drilling an additional well to the producing formation location is economically profitable if the well is closed off.

In one multi-arm caliper tool where the tool is pulled or pushed within the tubular, the tool includes mechanical probe arms that contact the inner surface of the tubular and mechanically transfer the radial geometric variations of the tubular to a transducer individually associated with each arm that in turn translates the mechanical variations of the distance from the tip of the arm in contact with the inner surface of the tubular to the tool housing into electric signals that are fed to a data processing and transmission system, which may be on-board the tool or which may be transmitted, via a wireline, to a remote location such as a surface location where a casing in a well bore is being evaluated. Alternately the signal may be simply recorded within a recorder that is located within or in the vicinity of the caliper tool as part of the downhole tool.

To translate the mechanical movement of the probe into an electrical signal, the probe is interconnected to a transducer such as a linear variable differential transformer, otherwise known as an LVDT, a differential variable reluctance transducer, otherwise known as a DVRT, or a single ended variable reluctance transducer, otherwise known as a SVRT, wherein movement of the mechanical probe at the end of the probe in contact with the inner surface of the tubular causes movement of a core relative to a winding of the transducer. The winding is powered by a power source, and as the core moves relative to the magnetic field induced by the winding, it causes perturbations thereof. These perturbations and the resulting changes in the electric field are converted to electric signals representative of the distance the core has moved with respect to the winding, and, thus changes in the relative position of the end of the probe arm in contact with the inner surface of the tubular are converted into an electric signal. As the tool traverses a tubular in a well bore, it encounters different ambient temperatures, which, because of the mechanical nature of the tool cause changes in length of the various physical components thereof, as well drift and falloff in the output signal of the electrical components. This includes the fall off of the output signal of the transducer as a result of an increase in wiring resistance of the copper coils of the transducer due to an increase in the temperature to which the transducer is exposed. Inductive sensors such as transducer experience a shift in calibration with variations in temperature due to a change in resistance of the transformer windings thereof, i.e., the windings which, as a result of the movement of a metal or magnetic piece with respect thereto, cause a change in the output of a signal from the windings. The windings are usually made of copper, which exhibits a change in resistance of approximately 3900 parts per million per degree centigrade, i.e., 0.0039% change in resistance per degree Celsius temperature change. The winding resistance is electrically in series with the inductive reactance of the winding at the frequency of excitation, resulting in a fall-off of the signal with an increase in temperature, given a constant amplitude and frequency excitation signal.

Where the erroneous readings indicate an impending loss of integrity of the tubular such as casing, expensive retrofitting of a sealing sleeve or coating over the indicated location, or plugging of the tubular at and below the location and closing off of the producing well, will occur when it is unnecessary to do so, resulting in significant unnecessary expenditure. Where an erroneous reading fails to detect an integrity issue, the tubular can fail leading to the leakage of the fluids therein into the adjacent environment. Where the temperature to which the tool is exposed undergoes a large temperature change, the falloff of the signal output may be so significant that meaningful data cannot be recovered, with the risk that impending tubular failure may not be detected. Likewise, the operator may need to run the evaluation over again, with resulting increased operation cost.

Thus, there is a need for a multi-arm caliper tool which provides a reliable signal indicative of physical measurement over a broad range of temperatures.

SUMMARY OF THE INVENTION

There is provided herein a measurement apparatus in which the windings of the transformer are driven with a constant current signal which results in a constant amplitude output signal independent of the temperature to which the tool is exposed during measurement. In one aspect, the measurement apparatus is incorporated into a tubular wall evaluation tool including a tool body, wherein the measurement apparatus is used to determine the condition of an internal surface of a tubular, and outputs a signal representative of that condition, wherein the effect of temperature change on the tool is ameliorated by providing the same current signal to the windings during the measurement period.

In one aspect, the tool is a multi-arm caliper tool, wherein a plurality of probe arms are extendable therefrom and into contact with the internal surface of the tubular, and each probe arm is individually coupled to a transducer which is configured to output a signal indicative of movement of the probe arm as the tool transits the tubular, the movement of the probe arm induced by changes in the surface geometry of the tubular inner wall.

In another aspect, the transducer is an LVDT, DVRT or SVRT, and a pulse generator is provided to provide a series of pulses of constant current over the period of the pulse to the winding(s) of the LVDT, DVRT or SVRT, wherein the resultant signal output of the LVDT, DVRT or SVRT does not experience falloff.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Provided herein are apparatus and methods for more accurately assessing the geometric condition, i.e., the actual inner wall profile and condition of a tubular, including the extend in height or depth of areas of erosion, inward bending, outward bending, weldments, seams, fissures and the like, over a broad range of operating temperatures without falloff in the signal of the measuring device.

Applicants have discovered that the integrity of a measurement tool output signal used for the assessment of the geometric condition, i.e., the actual inner wall profile and condition of a tubular may be enhanced by incorporating a constant current driver as the driver for the winding of the measuring transducer winding and thereby ameliorate the effect of temperature change on the output signal of the measurement tool. For purposes of illustration, the apparatus and methods for providing this improved assessment will be described herein with respect to a multi-arm caliper tool, useful to assess the condition of the inner wall of casing cemented into place in a wellbore.

Figure 1:
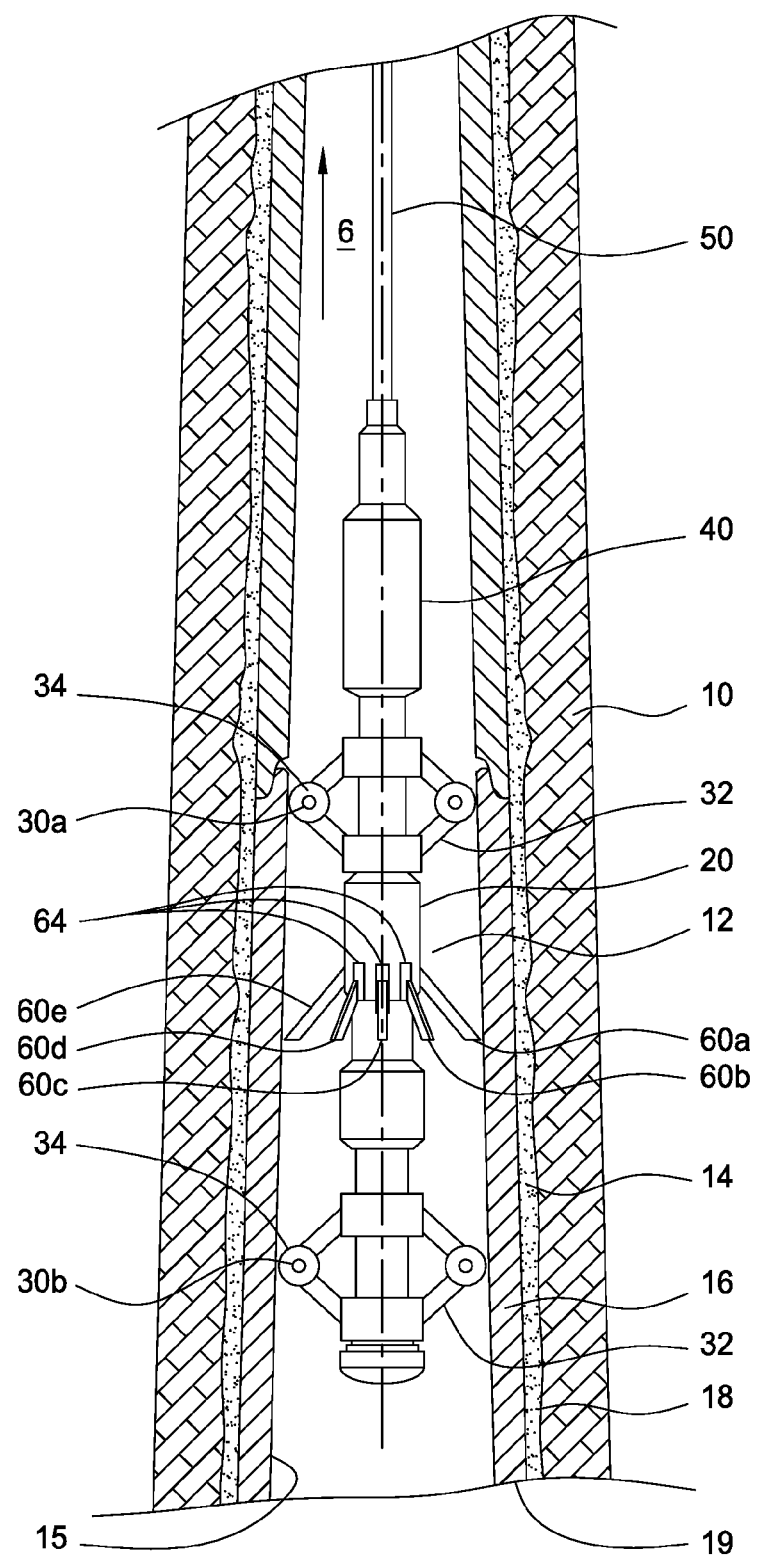
FIG. 1 is a sectional view of a cased wellbore, showing a multi-arm caliper tool suspended therein by a wireline.

Referring to FIG. 1, an evaluation tool 10 configured for evaluation of the interior surface of a tubular 14 described herein includes a caliper subassembly configured herein as a multi arm caliper tool 20, which is supported between a pair of centering stabilizers 30a, 30b, and a data acquisition subassembly 40 which is physically connected to the stabilizer 30a and is in communication via a link such as an electrical or optical link, with the multi-arm caliper tool 20. A line 50 is physically secured to an end 42 of the data acquisition subassembly 40 and extends to a remote location (not shown) and is used to position the tool 10 in the tubular 14. In the configuration of the tool 10 shown in FIG. 1, the tubular is a casing 16 which is held in a well bore 19 by cement disposed intermediate the exterior of the casing 16 and the wall of the well bore 19. The line 50 may be a wireline, in which data signals generated in the data acquisition subassembly 40 which are indicative of the geometric condition of the inner wall 15 of the casing 16 may be transmitted to a remote surface location. The tool 10 is lowered into the casing 16 with the centering stabilizers 30a, 30b in a retracted state (not shown), and when a desired depth is reached, the arms 32 are extended to the position shown in FIG. 1, whereby rollers 34 engage the inner wall 15 of the casing 16. Although each centering stabilizers 30a, 30b are shown having two arms, at least three, and preferably more, arms 32 extend from the centering stabilizers 30a, 30b to center the multi-arm caliper tool 12 located therebetween within the casing 16.

Figure 2:
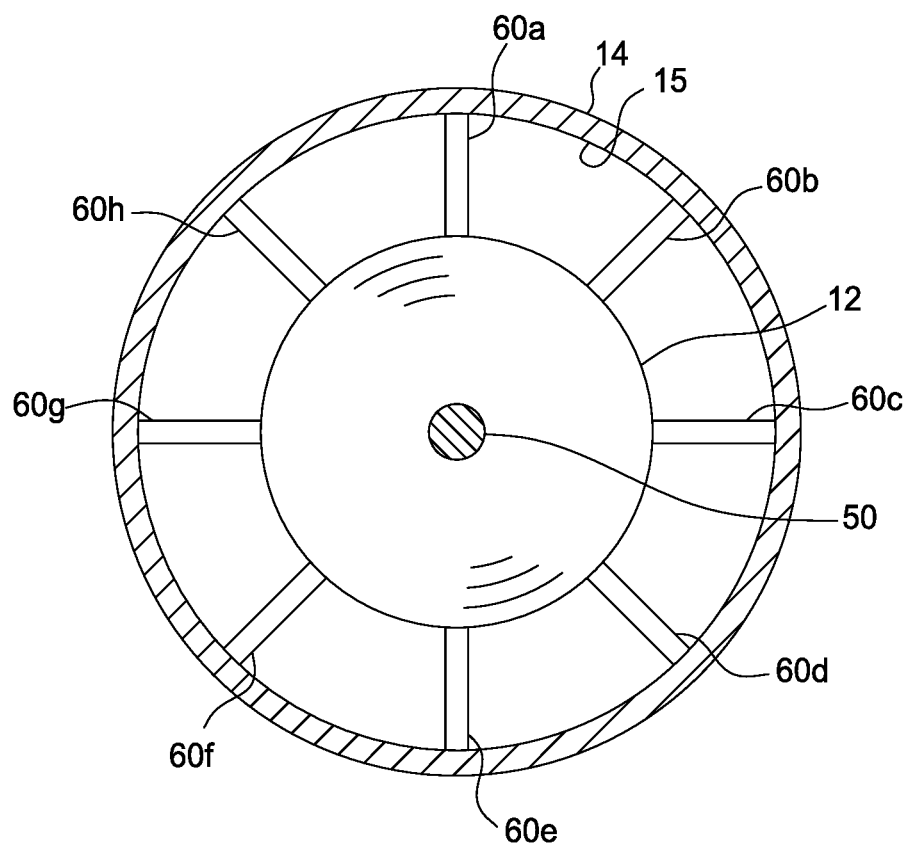
FIG. 2 is a view of the multi-arm caliper tool showing the deployment of the probe arms thereof against the interior wall of the casing.

As will be described further herein, the multi-arm caliper tool 12 includes a plurality of probe arms 60, and in FIG. 1, five such probe arms 60a to 60e are shown. Each probe arm 60 is retractable into a position extending generally along the length of the tool to protect them as the tool 10 is lowered into the casing 16, and is also positionable in an extended position as shown in FIG. 1 where the tips of the probe arms engage the inner wall 15 of the casing 16. Once the multi-arm caliper tool 12 is centered, the probe arms 60 are freed from the retracted position, and the tips thereof engage the inner wall 15 of the casing 16. As shown in FIG. 2, wherein the casing 16 is undisturbed, i.e., is round, and does not include loss of integrity regions such as kinks, out of roundness, or wall erosion, the multi-arm caliper tool 12 is supported by above by wireline 50, and a plurality, in this example for purposes of ease of understanding, eight probe arms 60a-h, extend outwardly from the body of the multi-arm caliper tool 12 and engage the inner wall 15 of casing 16. FIG. 2 shows a view of the multi-arm caliper tool 12, showing a plurality of probe arms 60, for ease of understanding and to correspond to the structure shown in FIG. 1, eight probe arms 60. However, it is to be understood that a multi-arm caliper tool may have a greater or lesser number of probe arms 60, typically 4forty or more such probe arms 60, and eight probe arms 60 are depicted herein for purposes of illustrating the multi-arm caliper tool 12, and not for purposes of limitation. The greater the number of arms, the better is the circumferential coverage, i.e., the greater the percentage of the wall contacted by an arm, and thus evaluable by the multi-arm caliper tool 20, for a given nominal tubular diameter.

Once the probe arms 60 of the multi-arm caliper tool 12 are deployed as shown in FIG. 1, the wireline 50 is pulled upwardly, toward the surface (not shown) at a consistent rate of 10 to 60 feet per second (f/s). As the tool 10 moves upwardly in the direction of arrow U in FIG. 1, the rollers 34 on the centering stabilizers 30a, 30b allow the tool 10 to move upwardly with minimal friction, and the multi-arm caliper tool 12 remains generally centered in the casing 16. As the multi-arm caliper tool 12 moves upwardly in the casing 16, the probe arm 60 tips are spring loaded to engage against the inner wall 15 of the casing 16, and variations in the distance from the interior of the multi-arm caliper tool 12 with respect to the adjacent inner wall along a radius over which any probe arm 60 extends results in motion of the probe arm 60 tip towards or away from the body of the multi-arm caliper tool 12.

Figure 3:
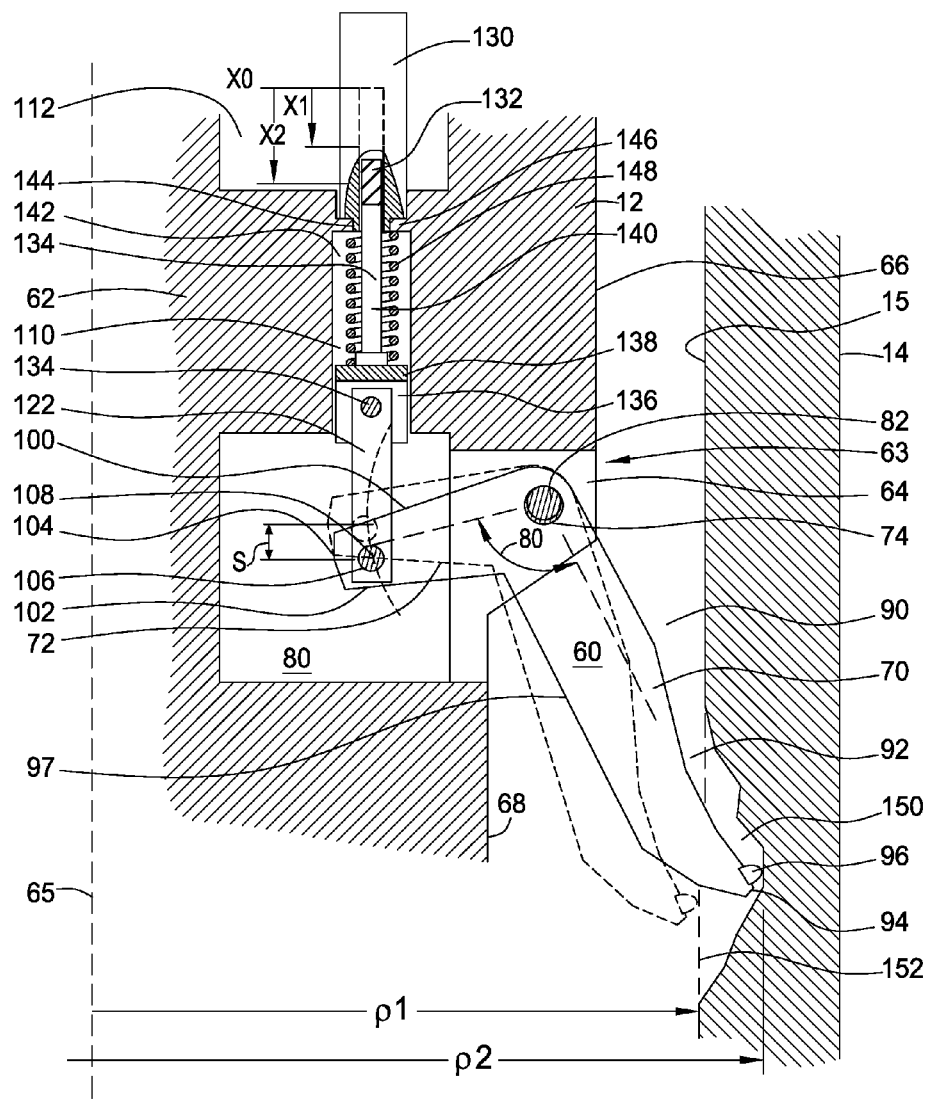
FIG. 3 is a partial sectional view of the housing of the multi-arm caliper tool, showing the deployment of a probe arm thereof against the inner wall of well casing, and the interconnection of the probe arm and an LVDT.

Referring now to FIG. 3, a partial sectional view of the multi-arm caliper tool 12, showing the details of the contact of a single probe arm 60 with the inner wall 15 of the casing 16 is provided. Multi-arm caliper tool 12 comprises a housing 62 within which a plurality if probe arm pockets 63 (only one shown in FIG. 3) extend inwardly of the sidewall 66 thereof, such that a probe arm 62 is received in, and extends from, each probe arm pocket 63. A slot 64 is provided for each probe arm 60 such that a portion of the probe arm 60 extends outwardly from the slot 64, and an additional portion of the probe arm extends inwardly from the slot 64. The sidewall 66 of the multi-arm tool 12 extends as a right cylindrical surface, generally centered around the centerline 65 of the tool. The inner end of the probe arm 60 is connected to a distance sensor 120, such as an LVDT, such that motion of the probe arm 60 in response to changes in the adjacent inner wall 15 surface of the casing 16 as the multi-arm caliper tool 12 moves in the casing may be converted to representative electrical signals.

Each probe arm 60 is configured having a generally dog-leg shape, wherein a first arm portion 70 is positioned to extend in a first direction outwardly of the slot 64 and a second arm portion 72 extends in a second direction inwardly of the housing 66 from the slot 64 into a secondary opening 80 in the housing 66. The extending directions of the first and second arm portions 70, 72 form substantially right angle 80 centered at a mounting pivot aperture 74 by which the probe arm is secured over a pivot pin 82 extending across the slot 64 in the general direction of the circumference of the housing 66. Thus, the probe arm 60 is secured within the slot 64 but is free to rotate about the pivot pin 82.

First arm portion 70 extends from pivot aperture 74 outwardly of slot 64 and includes an outer wall 90 disposed in a position generally facing the exterior of the tool 12, and includes a recessed contoured portion 92 terminating at tip 94. Inner wall 97 thereof extends adjacent a recess wall 68 of the housing 64 extending below the position of slot 64, and includes an inwardly double canted face adjacent the end thereof terminating at tip 94. On contoured portion 92 of outer wall 90 adjacent tip 94 is disposed an extending tip 96. First arm 70 is configured such the extending tip 96, which extends outwardly from the outer wall 90, engages the inner surface 15 of the casing 16. Extending tip is manufactured from a high wear resistant material, such as a carbide or diamond, which has higher wear resistance than the material of probe arm 60, which may comprise steel such as stainless steel.

Second arm portion 72 extends from pivot aperture 74 inwardly of slot 64 and terminates within secondary opening 80 of housing 66. The upper and lower side walls 100, 102 of the second arm extend to a gable shaped end 104, and a secondary aperture 106 extends through the second arm 72 inwardly of the gabled end 104. A transducer pin 108 extends through the secondary opening 106, to secure the second arm 72 to the transducer actuating arm 122 of the distance sensor 120 as will be further discussed herein.

Referring still to FIG. 3, housing 62 includes passage 110 extending upwardly from secondary opening 80 and into a transducer pocket 112. Distance sensor 120, includes an LVDT 130 positioned in transducer pocket 112 about the opening of actuating arm passage 110 thereinto, a spring loaded pin 134 extending through the passage 110 and extending inwardly of the transducer pocket 112 within the LVDT 130, with the ferromagnetic core 132 of the LVDT 130 disposed on the end thereof extending inwardly of the LVDT 130, and the transducer actuating arm 122 pivotally connected to the portion of the spring loaded pin 134 closest to the secondary opening 80.

As the multi arm caliper tool 12 traverses upwardly in the casing 16 and encounters a disturbance in the wall 15 of the casing 16, the extending tip 96 thereof will move toward or away from the housing 66 of the multi arm caliper tool 12. Because the arm 60 pivots about pivot pin 82 and second arm 72 extends at an oblique angle 80 from first arm 70 and inwardly of the housing 66, motion of the extending tip 96 toward and away from the housing 66 translates into movement of the center of the transducer pin 108 along the arc 136, which moves the transducer actuating arm 122 generally inwardly or outwardly of the passage 110. Movement of the transducer actuating arm 122 causes movement of the spring loaded pin in the passage 110, resulting in movement of the ferromagnetic core 132 of the LVDT 130 within the body thereof. This movement of the ferromagnetic core 132 in the body of the LVDT generates a disturbance in the electric field of the LVDT, which is measured and converted to a signal which is indicative of the motion of the probe arm tip 96 caused by changes in the geometry of the wall 15 of the casing 16.

Referring still to FIG. 3, spring loaded pin 134 includes a first portion 136 having a flange 138 thereon from which a pin 140 having the ferromagnetic core 132 on the distal end thereof extends, and a blade portion 136 extending outwardly of the underside of the flange 138 wherein the pinned connection to the actuating arm 122 is pivotally connected thereto. Passage 110 includes a major diameter portion extending from opening 80 in the direction of pocket 112, and a minor diameter portion 144 communicating therewith and extending into communication with pocket 112, such that an annular ledge 146 is disposed in passage 110 adjacent to the pocket 112. A seal, not shown, may be provided in a gland extending inwardly of the circumferential wall of the minor diameter portion 144 to enable reciprocating movement of the pin 134 therethrough, but also seal off the pocket 112 region from fluids in the tubing. A spring 148, such as a coil spring, is received between flange 138 and annular flange 148, and around pin 134, such that the spring tends to urge flange 138, and thus the pin 108 in the end of second arm 72 of probe arm 60, in the direction away from the passage (downward in FIG. 3), and hence, urges the probe arm tip 96 against the inner wall 15 of the casing 16, i.e., outwardly of the housing 66 to maintain the extending tip 96 on the tip 94 of the probe arm in engagement with the inner wall 15 of casing 16.

As discussed previously, each of the probe arms 60 pivot at pivot pin 82 extending generally in the circumferential direction of the housing 66. To help ensure that each probe arm 60 aperture 74 is positioned on the same circumference, and thus each probe arm extending tip 96 will extend equally from the housing 66 if the housing 66 is centered in the tubular and the tubular is perfectly round, each pivot pin 82 is positioned such that the center thereof, i.e., the center of the linear span of the pivot pin 82 across the slot 68 is on the same circumference around the centerline of the housing 66.

Referring still to FIG. 3, an erosion region 150 is depicted extending inwardly of the wall 15 of casing 16, and the end of probe arm 94 extends inwardly of the erosion region 150, such that probe arm extending tip 96 maintains contact with the now eroded wall 15 surface. The original wall surface 152 is shown in phantom, as well as the position of the probe arm 60 and probe arm extending tip 96 if the tip 96 was engaged against the original wall surface 162. As can be seen in the Figure, the distance the probe arm tip 96 has travelled to the deeper part of the erosion region 150 (furthest inwardly of wall 15) is the difference between dimensions p1 and p2. This movement results in movement of the pin 108 in second arms through an arc having an equivalent linear distance in the longitudinal direction of the pin 134 of "S". The movement of the pin 108 through distance S causes an equal movement of the magnet 132 by the same distance, shown within the LVDT 130 as X1. Thus the tool 12 may be calibrated to correlate a difference between p1 and the actual distance between the tool centerline 65 and the end of the extending probe tip 69, and a corresponding stroke or movement of the magnet 132 in the LVDT. Likewise, at a single temperature, the difference between p1 and the actual distance between the tool centerline 65 and the end of the extending probe tip 69 can be correlated to an electrical signal output from the LVDT 130.

Figure 4:
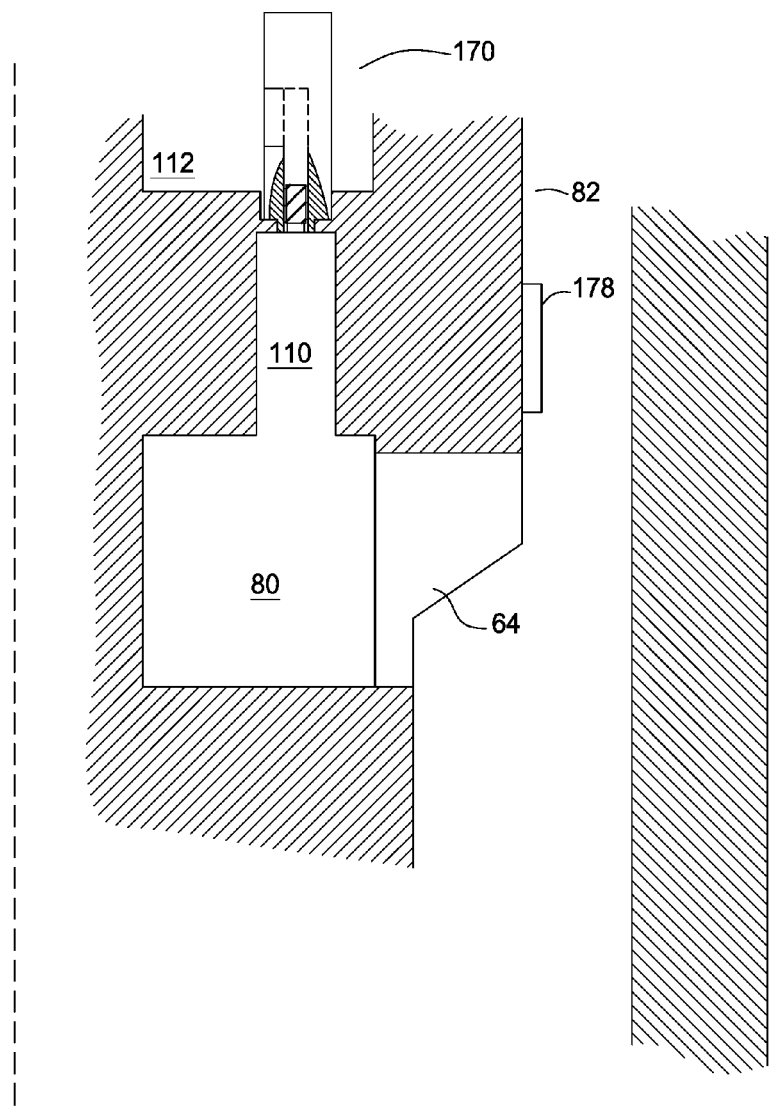
FIG. 4 a partial sectional view of the housing of the multi-arm caliper tool showing the location and arrangement of a reference transducer therein.
Figure 5:
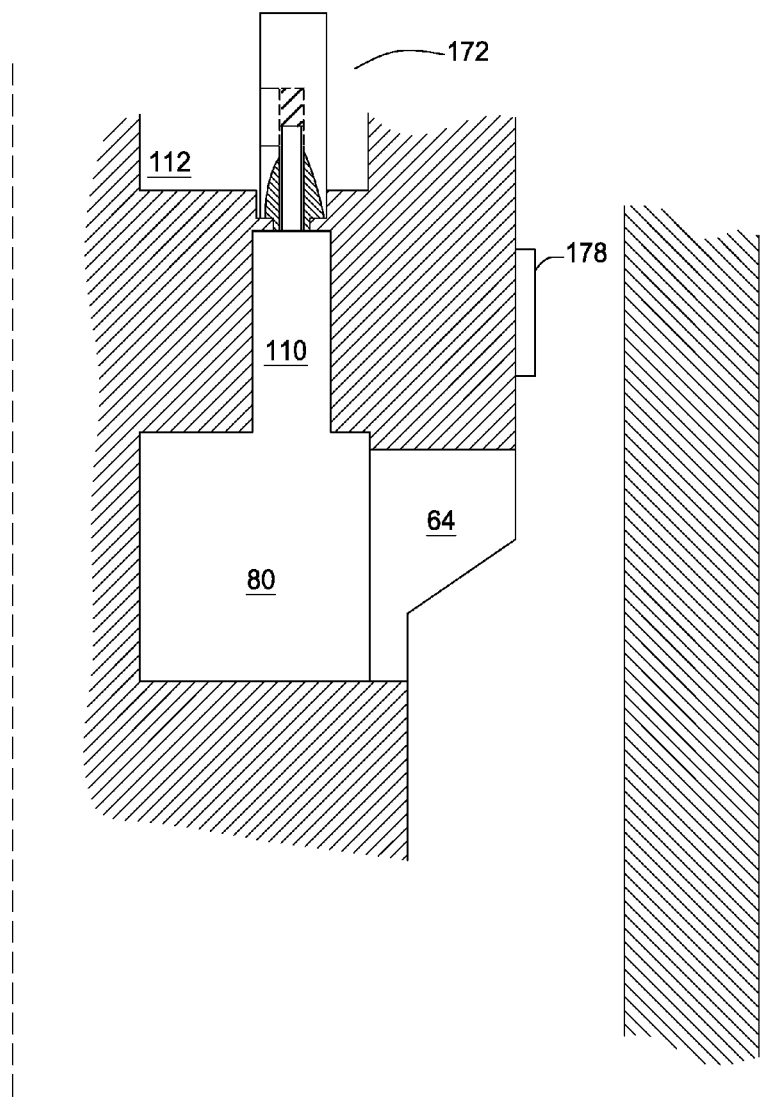
FIG. 5 a partial sectional view of the housing of the multi-arm caliper tool showing the location and arrangement of a reference transducer therein.

Referring now to FIGS. 4 and 5, the configuration of two locations within housing 82 where reference LVDT's are located is shown. In the tool 10, in order to more effectively compensate for temperature based drift in the measured readings of the multiple LVDT's 130 which are linked to arms 60, two reference transducers configured as modified LVDT's 130 configured to provide an electrical signal and enable an assessment of temperature induced drift on the output of the LVDT's 130 linked to the probe arms 60, full extension reference transducer 170 and fully retracted reference transducer, are provided in transducer pockets 112 similarly to the LVDT's 130 used to convert the mechanical motion of arm 60 into electrical signals. The transducer pocket 112 for the reference transducers 170, 172 are configured to open into passage 110, opening 80 and slot 64. Thus, the ambient conditions experienced at the reference transducers 170, 172, are as closely matched as possible to those of the active LVDT's interconnected to probe arms 60. These reference transducers 170, 172 may be located in adjacent open slots in the side wall of the housing 82, or may be disposed so as to be spaced apart by slots 64 having active probe arms 60 therein.

Referring first to FIG. 4, the fully extended reference transducer 170, i.e., the reference transducer 170 in which the ferromagnetic core thereof is shown in the position where an active transducer would be if connected to a probe arm in a fully extended from the tool state, is configured such that the ferromagnetic core 132 thereof is fixed within the transducer 170 in a position where the magnet in a measuring LVDT, at the maximum outward position of the extending tip 96 of the arm 32 interconnected thereto, would reside. The ferromagnetic core 132 is affixed therein, in this position, by a high temperature adhesive selected to minimize interference with the magnetic field generated by transducer 170. A thermocouple or other temperature measuring device such as a temperature probe 178 is also provided on the housing adjacent to the slot 64, for enabling measurement of the in-situ temperature of the reference transducer 170.

Referring to FIG. 5, the fully retracted reference transducer 172 is configured such that the magnet 132 thereof is fixed within the transducer 170 in a position where, the magnet 132 in an LVDT attached to a probe arm in a fully retracted state, i.e., at the maximum inward position of the tip 96 of the arm 32 interconnected thereto, would reside. The ferromagnetic core 132 is affixed therein, in position, by a high temperature adhesive selected to minimize interference with the magnetic field generated by the magnet 132. A thermocouple or other temperature measuring device such as a temperature probe 178 is also provided on the housing adjacent to the slot 64, for enabling measurement of the in-situ temperature of the reference transducer 170.

Figure 6:
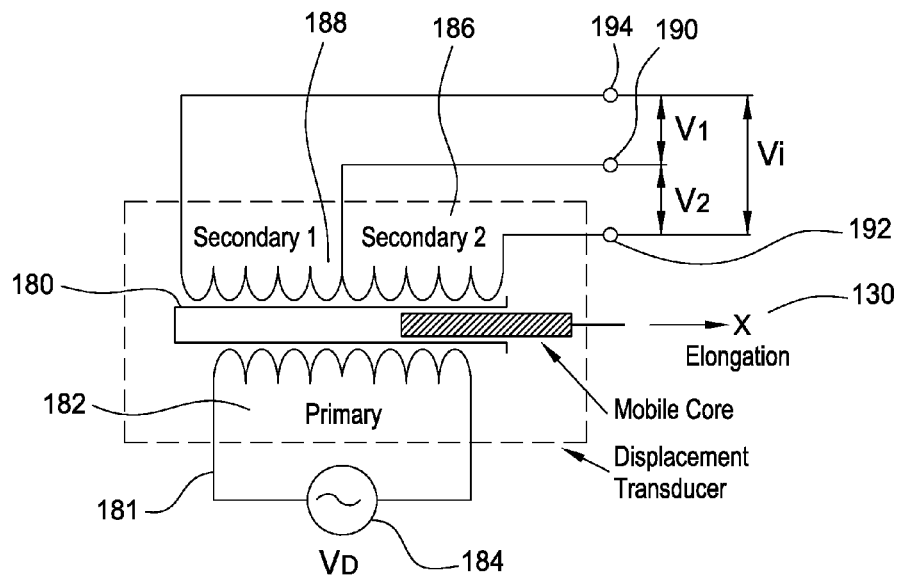
FIG. 6 is a schematic representation of the structure of an LVDT.
Figure 7:
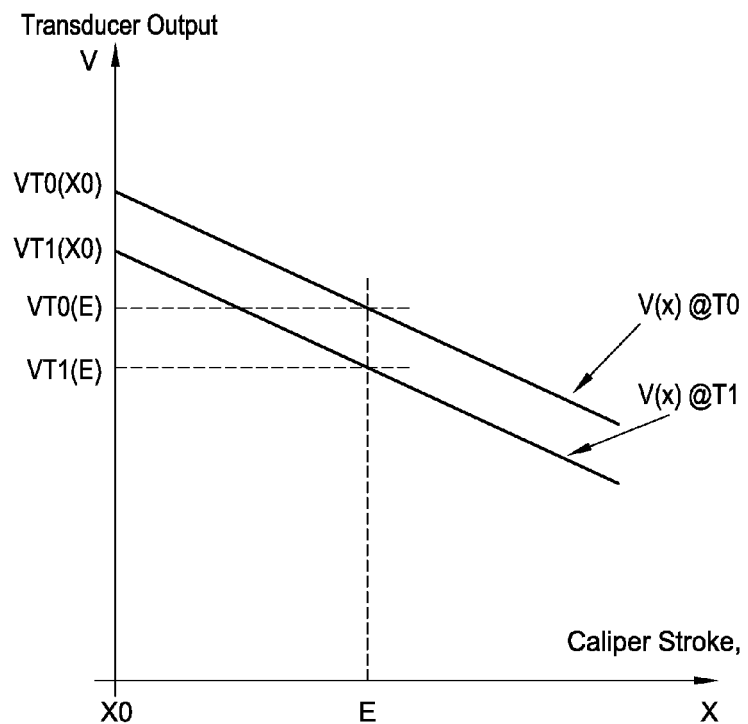
FIG. 7 is a graph representing the output of the LVDT at different temperatures over a range of probe arm movement.
Figure 8:
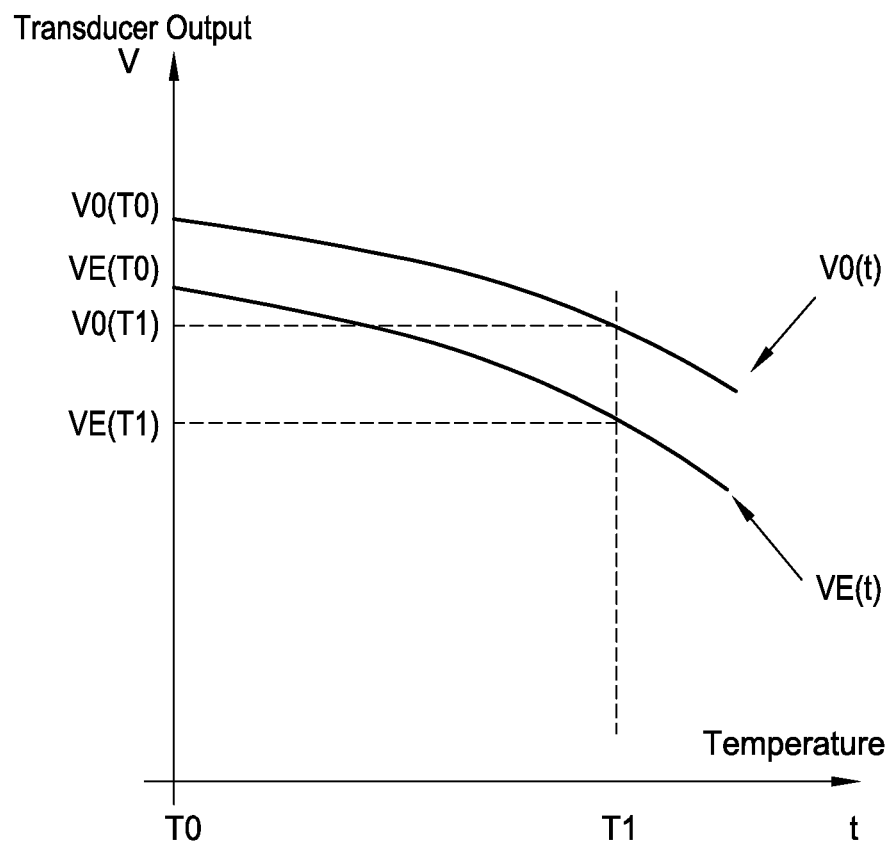
FIG. 8 is a graph representing the output of the LVDT at different temperatures at a single probe arm position.

Referring now to FIGS. 6 through 8, the operation of an LVDT 130, and the effect of temperature change thereon, are generally depicted. Referring initially to FIG. 6, the LVDT includes a mobile core configured as the magnet 132, which is moveable within a tubular housing 180. To one side of the tubular housing 180 is disposed a driving primary coil 182 which is driven by a sinusoidal or other ac drive voltage at a relatively low voltage, and to the opposite side of the tubular housing 180 is disposed a split driven, or secondary, coil 186, having a center tap 188 positioned approximately mid-way down the length of the secondary coil 186, and positioned in the center of the stroke of the magnet 132 in the tubular housing 180 between the fully retracted and fully extended positions of an arm 32.

A first tap line 194 is connected to the end of the secondary coil 186 adjacent the end of tubular housing 180 where magnet 132 is positioned when arm 32 is fully retracted, and a second tap line 192 extends from the end of secondary coil 186 where the magnet 132 is positioned when arm 32 is in the fully extended position. A center tap line 190 extends from center tap 188. The arrangement of the primary and secondary coils 180, 186, power supply 184 each LVDT 130, and taps and tap lines 188, 190, 192 and 194 are identical for all LVDT's 130 and the reference transducers 170, 172.

For ease of understanding, assuming the ferromagnetic core 132 is centered along the length of the tubular housing 180. As the probe arm 60 (FIG. 3) connected to the LVDT 130 moves inwardly of the housing (the extending tip 96 is travelling on the direction of the housing 82) a voltage V1 and V2 are measured between center tap line 190 and first and second tap lines 192, 194. Likewise, when extending tip 96 on the probe arm 60 moves in the direction away from the housing 82, the magnet 132 is moved in a direction outwardly of the tubular housing 180, causing voltages V1 and V2 to appear between the center tap line 190 and the first and second tap lines 192, 194. The location and magnitude of the voltages between the center tap line 190 and the tap lines 192, 194 indicate the direction and extent of movement of the tip 94 vis-a-vis the centerline of the housing 82, indicative of the condition of the wall of the tubular 14 against which extending tip 96 is engaged. Likewise, the reference transducers 170, 172 are driven at the same ac voltage as the LVDT's 130, and a reference signal corresponding to a fully retracted and a fully extended arm position is generated between center tap line 190 and first and second tap lines 192, 194. It is understandable that other variations of LVDT wiring and respective geometric position of the ferromagnetic core could be similarly used in a way the output signal could vary in the opposite direction such as the output signal would increase as the caliper stroke increases positively.

Referring now to FIGS. 7 and 8, the effect on temperature on the output of the LVDT's and reference transducers is shown. As is seen in FIG. 7, for a given caliper stroke, as the temperature T of the transducer changes from ambient T0 to a higher temperature T1, the voltage detected at the secondary coil 186 drops. As shown in FIG. 8, as the temperature of the transducers in the LVDT's 130 and reference transducers 170, 172 increases, the difference in voltage output between a non-extended VO and extended VE tip 94 changes, such that the same extension of the tip 94, and thus the same movement of the magnet 132 within the tubular housing 180, results in a greater voltage change as shown by the divergence between the Voltage curves for Vo(t) and VE(t) as the temperature increase from t0 to T1.

Thus, operating conditions encountered when the tool 10 is operating in a well bore casing, tubing or the like, the downhole measurement at each LVDT 130 and the reference transducers 170, 172 produces a raw signal output that is affected by temperature. The ambient temperature encountered by the tool 10 can substantially vary, and the effect on the LVDT 130 and the reference transducers 170, 172 can vary based upon on the type of transducer and depending on the way the transducer is actually operated in a given tool. For purposes of the description hereof, the transducers are LVDT type transducers driven with a low voltage sinewave which can operate at a frequency between 5 khz and 40 khz. As discussed previously, the mechanical displacement of the probe arm tip 96 causes movement of the ferromagnetic core 132 (magnetic core) which produces a specific signal amplitude (the output) that can be described by a continuous and linear function over the actual working domain of the transducer, 1. The voltage output of the transducer is maximum when the magnet 132 is in a retracted position, i.e., the position shown in FIG. 5 and diminishes, i.e., is reduced, as the ferromagnetic core 132 extends outwardly toward the position thereof in FIG. 4, 2. The overall effect as the temperature is increased, resulting from a combination of factors, is characterized by a gradual decrease of the transducer output for a given probe arm 60 extension from the housing 82, or tip extension 96 distance from the housing 82, as the temperature encountered by the tool 10 increases. This effect is substantially linear and homogeneous assuming transducers and use thereof follows precautions that are of the general knowledge in the domain of measurements performed in wells.

At a given temperature T variation of the output signal of a displacement transducer "i" varies substantially linearly and can be described by the following linear function (1):

$$Vi(x) = Vi(X0) + Ki \times (x - X0)$$

Where (2):

$$Ki = \frac{Vi(Xf) - Vi(X0)}{(Xf - X0)}$$

Figure 9:
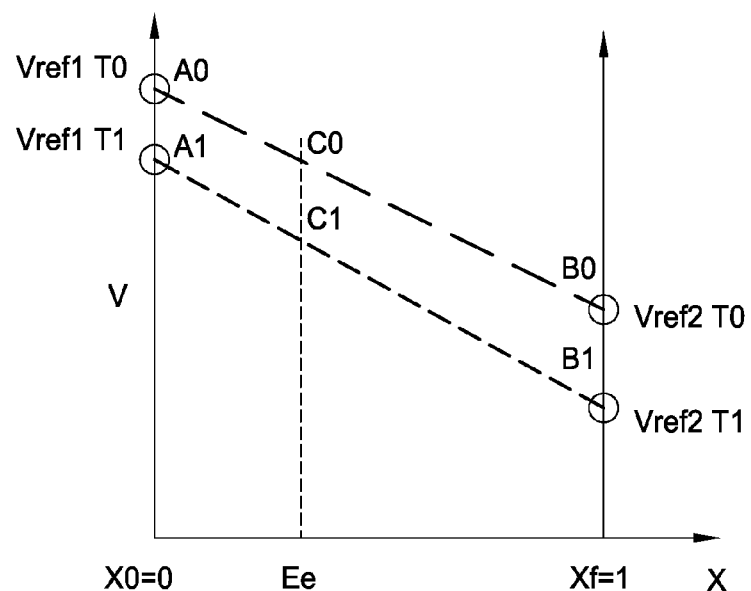
FIG. 9 is a graph representing the output of the reference LVDTs at different temperatures.
Figure 10:
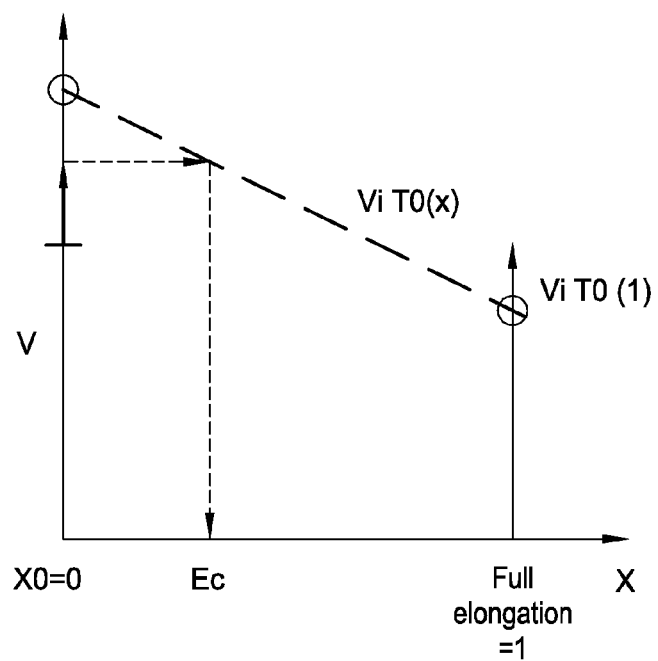
FIG. 10 is a graph representing the voltage output of an LVDT at affixed temperature.

Ki: is the gain of the transducer and is represented by the slope of the response line, In FIGS. 7, 9 and 10, X0 marks the minimal position of the mechanical input in the displacement transducer, that coincides with Vi(X0) which is considered the electrical zero of the measurement after calibration and also is the intersect (ordinate) on the LVDT 130 response graph, In FIG. 10, Xf denotes the maximal position of the mechanical change in the displacement of the ferromagnetic core 132 in the LVDTs 130. It coincides with the full scale of the measurement Vi(Xf).

The plurality of LVDT's 130 and reference transducers 170, 170 share a common drive and are calibrated at ambient temperature, i.e., where used to evaluate a well bore tubular at the surface or in a laboratory, so each transducer's (130, 170, 172) output is respectively characterized at least for a minimum mechanical position (retracted) of the arms 32 and for a maximum mechanical position (extended) of the arms 32. Other intermediate arm 32 positions may also be evaluated during the calibration operation. Ambient temperature is generally the one experienced while preparing for a tool operation at a wellsite. Therefore this reference temperature is somewhat arbitrary.

Output signals from all transducers, including the active-LVDTs 130 connected to arms and the reference transducers 170, 172, are recorded and maintained in the memory of a logging acquisition system during calibration.

When the actual measurement commences downhole, the tool has already been submitted to the borehole temperature during its descent into the well and the calibration measurements performed at surface can no longer be used directly because the transducers have now a response that is altered by a certain temperature factor. Prior art systems have used predictive algorithms which attempt to provide calibrations and corrections for changes in the tool temperature, but, these systems may result in errors in measurement of the geometry of the tubular inner surface.

Referring now to FIGS. 9 and 10, the use and operation of the reference sensors 170, 170 are graphically shown. At the calibration, i.e., ambient surface temperature where the tool is calibrated, reference sensor 172 having its ferromagnetic core secured in the fully retracted position provides a voltage output of V1 ref (T0) shown at the "A0" mark on FIG. 9. Reference sensor 170, having the ferromagnetic core 132 thereof fixed in the fully extended position, has a voltage output of V2 ref (T0) shown at the "B0" location on FIG. 9. Thus, assuming a linear change in voltage output from the transducers of the LVDT's, the linear segment A0-B0 represents a single virtual transducer, operating over a virtual full stroke, where the full stroke of the ferromagnetic core (which corresponds to the full measureable stroke of the extending tip 96) is normalized to 1. This linear function has the following form for a pair of reference sensors 170, 172:

$$VrefT0(x)=Vref1T0+KrefT0 \times x$$

Where:

$$KrefT=V(A0)-V(B0)$$

At any temperature T1 the pair of reference transducers 170, 172 behave in a similar fashion as the plurality of active transducers in the LVDT's 130. Each respective output signal is shown as A1, B1 on the graph that determines another linear segment featuring the virtual output of the reference sensors at a temperature T1. The function becomes:

$$VrefT1(x)=Vref1T0+KrefT0 \times x$$

Where:

$$KrefT1=V(A1)-V(B1)$$

As illustrated in FIG. 9, a temperature increase to T1 from T0 causes a negative shift of the intersect with the Y axis and also possibly some slight gain change, i.e., the slope of line segment from Tref1T0 to Tref2T0 is less than that from Tref1T1 to Tref2T1.

When the plurality of transducers of the LVDT's 130 and the reference transducers 170, 172 are calibrated using mechanical gauges at temperature T0, the output of each sensor is recorded for the purpose of normalizing the Y axis intersect and gain of all transducers to a uniform output. This is a general practice, as well as is maintaining the calibration values in a system memory. In the same manner herein, the output of the reference sensors during the calibration is also recorded along with the other data.

When a measurement is taken by a transducer "i", at temperature T1 different than T0

(a) The output signal is Vi is read-up along with temperature signal T1

(b) The value E of the magnet relative position from a "0" point, representative of the distance that extending tip 96 extends from the centerline 65 of the tool 12, is approximated as a function of Vi and T1

(c) Output reference signals Vref1 determines α, the correction coefficient at x=0 as:

$$\alpha=Vref1(T1)/Vref1(T0)$$

(d) Output reference signal Vref2 determines β, the correction coefficient at x=1 as:

$$\beta=Vref2(T1)/Vref2(T0)$$

(e) The determination of the correction coefficient for the transducer "I" is illustrated on the graph of FIG. 9. The abscissa E representing the position of the magnet 132 in the cylindrical housing 180 intersects the virtual reference line A1-B1 at C1 making the temperature correction coefficient "C" the result of a linear proportion of α and β (9):

$$C=\alpha \times (1-E)+\beta \times E$$

(f) The temperature corrected output of the transducer "i" is then calculated as (10):

$$Vic = \frac{Vi}{C}$$

(g) Now that Vi is temperature corrected, it is valid to refer to the initial expression of Vi at T0, the temperature at which Input and output of Displacement sensors have been calibrated (11)

$$ViT(x)=Vi(X0)+KiT \times (x-X0)$$

Now extracting "x" the mechanical input of the displacement transducer (12)

$$x = \frac{Vic - Vi(X0)}{KiT0}$$

Where:
Vi(X0) is the intersect of the caliper arm derived from calibration at T0
KiT0 is the gain of the transducer derived from calibration at T0.

Figure 11:
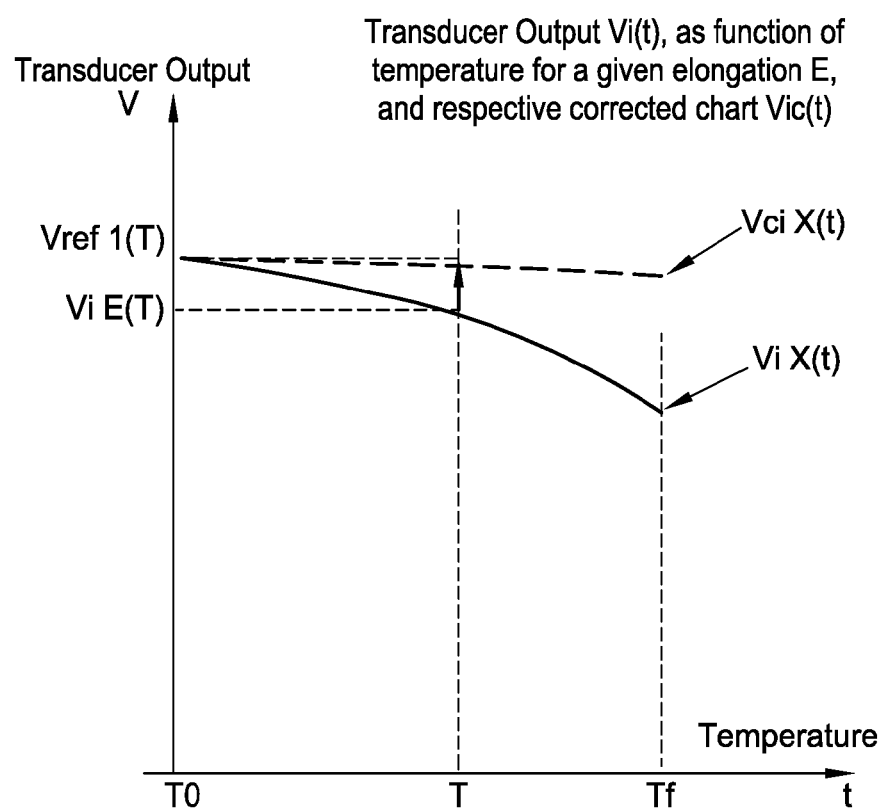
FIG. 11 is a graphical representation of a corrected LVDT output over an expected in use temperature range.

The result is shown graphically on FIG. 11, wherein the different effect on the output of the transducers, and thus the LVDT's over time is shown, and the correlation thereof to result in a corrected output is shown. Thus, as shown in FIG. 11, as the temperature increases, the measured voltage output of an LVDT drifts downwardly. By applying a correction factor derived in-situ, the actual position of the extending tip 96 on arm relative to the centerline of the housing may be more accurately established, as shown as the dashed line on FIG. 11.

Figure 12:
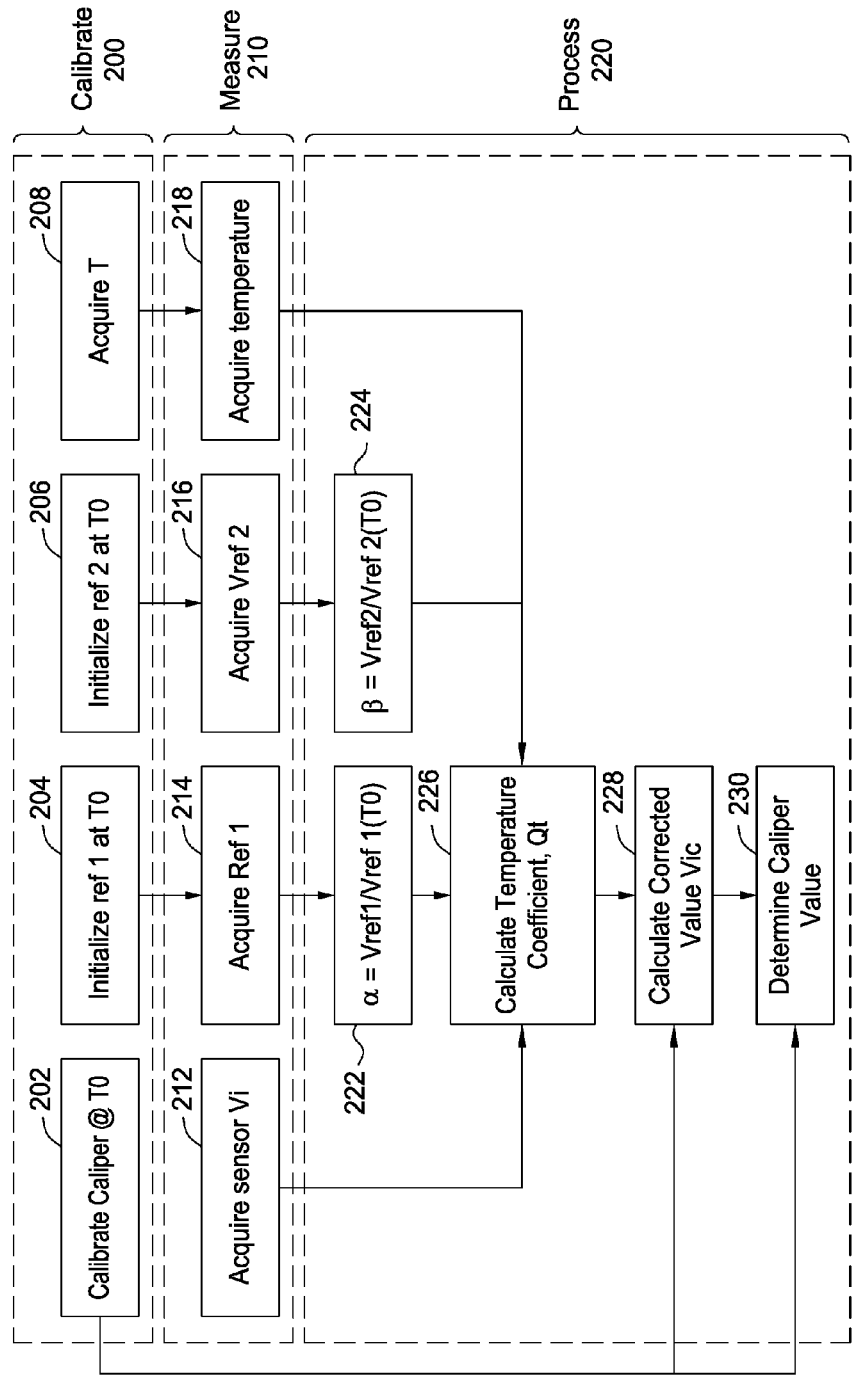
FIG. 12 is a flowchart demonstrating the steps of determining a correction value for the LVDT.

Referring now to FIG. 12, a method of using the tool 10 to obtain accurate information concerning the internal surface of a tubular is shown in chart form. Starting at the calibration step 200, the caliper arms are calibrated at step 202, wherein the change in voltage in each LVDT 130 is assessed across at least the fully extended, and fully retracted, position of the tip 94 of each arm 32. Simultaneously, the ambient temperature, the voltage in reference transducer 170 at the ambient temperature is measured at step 204, and the voltage in reference transducer 172 at the ambient temperature is measured at step 206, and recorded in a system memory. At this point, the tool 10 may be used to evaluate the interior surface of a tubular, such as casing 16.

Once tool 10 is located in the tubular, such as the casing 16, and the caliper arms 32 are deployed outwardly as shown in FIG. 3, the measuring step 210 may begin. As the tool 10 is pulled toward the surface and traverses the casing, each caliper arm 32 may move inwardly and outwardly of the housing, resulting in a voltage change at the LVDT interconnected therewith. Likewise, the output voltage of the reference transducers 170, 172 changes as the temperature thereof changes. As shown at step 210, logging is undertaken by measuring the voltage output of the LVDT associated with each caliper arm 32 at step 212, the reference voltage of the reference transducer 170 as is the reference voltage of the reference transducer 172, and the temperature of the housing is acquired from at least one of temperature probe 178 as the tool 10 is moving in the casing. These measurements are repeated tens or hundreds of times per second, the rate of acquisition of the measured inputs being dependent upon the speed at which the data can be processed and/or transmitted to the surface along the wireline 50. The measurements may be taken serially, by continuously opening and closing gates to each of the LVDT's 130, the two reference transducers 170, 172, and the thermocouple and correlating each set of such readings to a tool depth.

As the measurements are continuously taken in the measuring step 210, the measurements are converted to electrical signals and evaluated in the process step 200. For example, where 8 caliper arms are provided on the tool 10, data from the eight LVDT's 130 associated with each of the eight caliper arms 32 are sequentially evaluate, along with a reference voltage for each of reference transducers 170, 172, and at least one temperature probe 178 temperature signal. As seen at step 220, correction coefficients α and β are generated for use in determining the corrected distance of the tip 94 from the tool centerline. Coefficient α, representing the ratio of the output voltage of reference transducer 170 (fully extended reference) at the measurement temperature divided by the reference voltage thereof measured at ambient is calculated at step 222, and coefficient β representing the ratio of the output voltage of reference transducer 172 (fully retracted reference) at the measurement temperature divided by the reference voltage thereof measured at ambient as shown at step 224. These coefficients α and β are then used as correction factors, as discussed herein, to calculate a temperature correction coefficient at step 226, which is in turn applied to the voltage output of each of the LVDT's 130 associated with each caliper arm 32 at step 228, resulting in a corrected caliper arm voltage value 230 which correctly correlates to the distance the tip 94 of each caliper arm 32 extends from the centerline of housing 82. The resulting caliper arm voltage value 230 for each measured value of each LVDT is either stored in tool memory, or transmitted via wireline 5 to the surface, optionally along with the calibration data. The raw data determined in step 210 may alternatively transmitted along wireline 50, wherein step 220 is performed at the surface. Combinations of downhole and surface processing of the data may also be undertaken.

Figure 13:
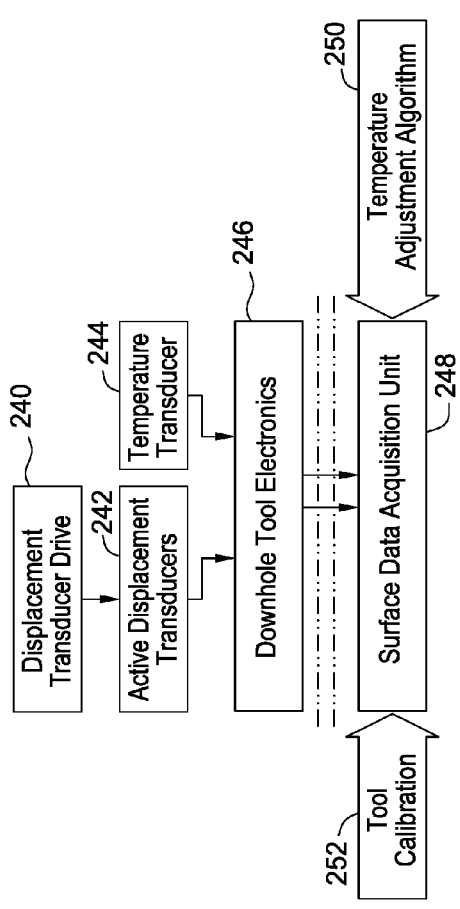
FIG. 13 is a flowchart demonstrating a methodology of using the multi-arm caliper tool and temperature adjustment algorithm to obtain corrected results for the geometric condition of the inner wall of the casing.
Figure 14:
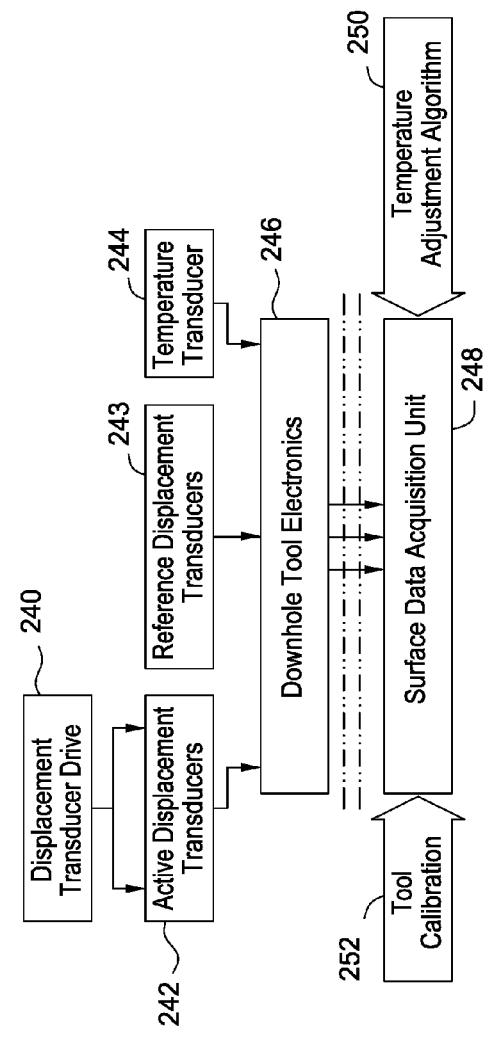
FIG. 14 is a flowchart demonstrating an alternative methodology of using the multi-arm caliper tool and temperature adjustment algorithm to obtain corrected results for the geometric condition of the inner wall of the casing.

Referring now to FIGS. 13 and 14, two different paradigms for data acquisition and processing are shown schematically in flow chart form. In FIG. 13, there is shown a methodology for active correction of the caliper arm tip 94 position without the use of reference transducers, wherein the individual LVDT's 130 associated with each of the caliper arms 32, or a sampling thereof, have been previously calibrated over an expected temperature range and correction factors representative of coefficients α and β were previously generated and stored in a system memory. In this approach, the voltage signal 240 is sent to the plurality of LVDT's 242, and the output thereof is received in the downhole tool electronics 246. Simultaneously, the temperature of the tool 10 is acquired from a temperature transducer 244, such as the temperature probe 178, and the displacement transducer and temperature transducer data is transmitted, via wireline 50, to a surface data acquisition unit which includes a programmed computer for computing the corrected tip 94 location using the temperature adjustment algorithm 250 and calibration data acquired at different temperatures before the tool was deployed in the well bore.

In FIG. 14, a paradigm for generating correction factors using reference transducers, such as reference transducers 170, 172, is shown. This paradigm, data acquisition and data flow are the same as that shown in FIG. 13, except now the reference transducers, shown at box 243 are used, and the coefficients α and β are generated based on the Voltage output, and drift or change in that voltage output, as the tool traverses the tubular being evaluated.

Figure 15:
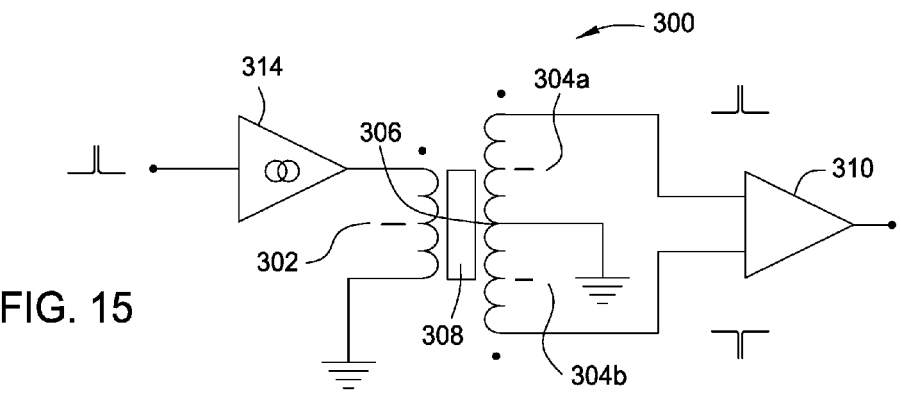
FIG. 15 is an electrical schematic of an LVDT incorporating a constant current driver.

Referring now to FIG. 15, an evaluation circuit for an LVDT 300, which may be incorporated into a caliper tool in replacement of LVDT 130 of FIGS. 3 and 6 hereof, is shown. The Linear Variable Differential Transformer (LVDT) consists of a primary winding 302 and a split secondary winding 304 with a first half-winding 304a of the secondary winding 304 counter-wound with respect to the other, second half-winding 304b of the secondary of the secondary winding 304, wherein the counterwound first and second half windings 304a, 304b extend from a center tap 306. The windings are disposed about a bobbin (not shown), over which the wire making up the windings 302, 304a and 304b is wound. Each secondary winding 304a, 304b resides in its own winding space on the bobbin. The primary winding 300 is wound over both secondary half windings 304a, 304b so that when powered it couples magnetically to both secondary half windings 304a, 304b. A ferromagnetic core is reciprocally disposed within a through bore within the bobbin. The center tap 306 is connected to ground, and each of the opposite ends of the first and second half windings 304a, 304b are connected to different ones of the input connections to a differential amplifier 310. On end of the primary winding 302 is grounded, and the other end thereof connected to the output of a constant current driver.

The position of the ferromagnetic core within the sensor is inferred by the output of the differential amplifier 310, as the differential amplifier 310 subtracts the signal of one secondary half winding 304a from the signal of the other secondary half winding 304b, resulting in an output that is proportional to the position of the magnetic core 308 within the bobbin.

Figure 16:
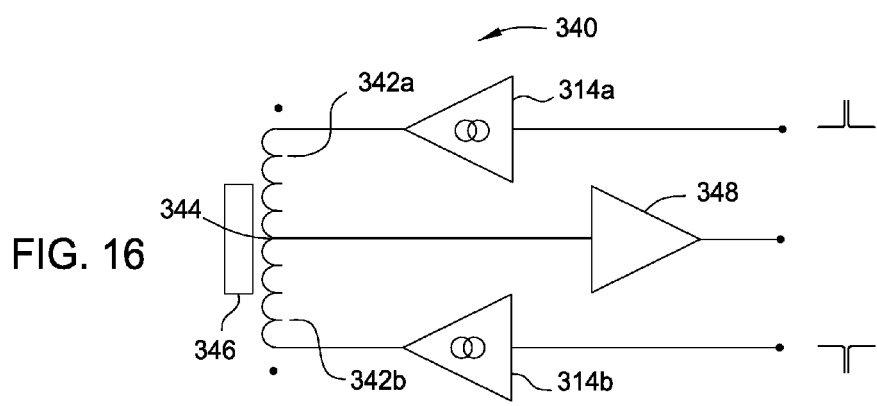
FIG. 16 is an electrical schematic of an DVRT incorporating a constant current driver.

Referring now to FIG. 16, a DVRT sensor circuit using the constant current drive method of winding resistance temperature compensation is shown. The DVRT is connected in bridge fashion to take advantage of the inherent cancellation of drift due to variation in coil resistance. The DVRT includes two counterwound windings 342a, 342b extending from a center tap 344. The center tap 344 is connected to the input of a buffer amp 348, and the output of the buffer amp 348 provides a signal from which the position of a permeable magnet core 346 relative to the center tap 344 is inferred. The ends of the windings opposite to the center tap are connected to the outputs of two different constant current drivers 314a, 314b. While this yields noticeable improvement in the accuracy of the measurement versus temperature, an additional improvement is realized due to the fact that each half of the sensor is independently corrected for coil wire resistances introduced by temperature gradients across the coils. In this circuit, there are two constant current drivers 314a, 314b. The two windings 342a, 342b are driven by precision pulses from the constant current drivers 314a, which pulses are exactly 180 Degrees out of phase. When the permeable magnetic core 346 is exactly in the middle of the sensor, i.e., the center of the two windings 342a, 342b, the signal, which is received by the Buffer Amp 348, is essentially zero because the two winding voltages, of exactly opposing magnitude, will cancel each other. Movement of the core 346 toward the winding 342a will produce an output that increases from zero to a positive voltage. Movement of the core 346 toward the winding 342b will produce an output that changes from zero to a negative voltage.

Figure 17:
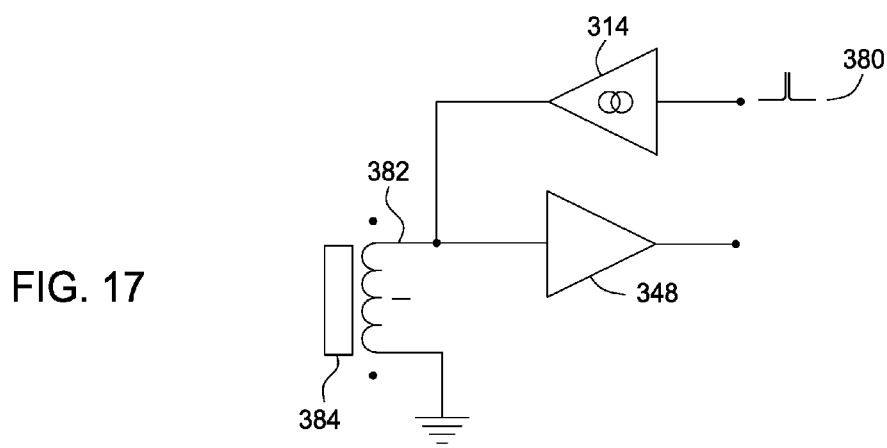
FIG. 17 is an electrical schematic of an SVRT incorporating a constant current driver.

FIG. 17 is a block diagram of the SVRT sensor circuit using the constant current drive method of winding resistance temperature compensation. One end of the winding 382 of the SVRT is connected to the output of a constant current driver 314 and to the input connection of a Buffer Amp, 348. The other end of the single winding 382 is connected to ground. A magnetic target 384 is provided and can be configured as a magnetically permeable core within a mandrel, over which the winding 382 is wound, or a ferromagnetic target in proximity to the end of the winding 382. The inductance of the winding 382 will increase as the core within the mandrel of the couples with an increasing number of turns of the winding 382 as it is further inserted thereinto. When deployed as a proximity sensor, the inductance will increase as the target moves in closer proximity with the end of the winding 382.

In each of the LVDT, DVRT and SVRT circuits described with respect to FIGS. 15 to 17, the output of the constant current driver(s) 314 is a pulse instead of a sine wave, to better facilitate high speed multiplexing of a large number of transducers, for example a plurality of transducers on a multi arm caliper tool 10. The width and amplitude of the drive pulses are very stable with time and temperature. For example, the constant current driver 314 may comprise a precision drive pulse generator which drives a precision voltage to current converter, such as a Howland Current Pump, to output current pulses of the same amplitude. The pulses are conditioned so as to remove higher odd order harmonics to reduce distortion caused by frequency components that might be close to the self-resonant frequency of the transducer windings. The output of the each circuit shown is fed into a Track & Hold Amplifier (not shown) which corrects for phase shift of the signal passing through the transducer by controlling the precise timing of sampling the signal peak. The output of the track and hold amplifier is fed into a high speed Analog to Digital Converter (not shown) which provides a digitized, sampled peak to a main controller (not shown). The entire acquisition cycle is under firmware control in the main controller. The complete circuit, including the main controller and its firmware, comprise an under-sampled, carrier to baseband demodulator. In a casing inspection multi arm caliper having a large number of transducers operating in an extremely hostile environment, a very high degree of aggregate accuracy in measurement can be obtained herewith.

Preferably, when configured for use in a multi-arm caliper tool, the operation of each sensor (LVDT, DVRT and/or SVRT) is multiplexed, for example using a number of 8-channel multiplexers, such that one out of every eight sensors can be active at any one time. By connecting each sensor into the multiplexer sequentially in relation to the circumferential positions thereof on the multi-arm caliper, cross talk is significantly reduced because active sensors are not physically close to one another around the circumference of the tool. Additionally, because the sensors are dormant, in terms of sensing, until the constant current driver 314 sends a signal thereto, power consumption in the tool is reduced. By providing a constant current output, such as a pulse or pulses of a constant and same current magnitude, temperature induced variation in resistance is irrelevant to the output of the sensor. Thus, a resistance change in the control circuitry and the sensor winding does not affect the sensor output, and fall off does not occur.

While the foregoing is directed to a specific embodiment of a tubular wall geometry evaluation tool, other and further embodiments may be devised without departing from the basic scope thereof, and the scope thereof is determined by the claims that follow.

We claim:

1. A sensor which is sensitive to the position of a magnetic core or metal target in proximity to a winding, comprising:
    a circuit, for measuring the position of said magnetic core or metal target, the circuit comprising a drive pulse generator which drives a precision voltage to a current converter, and
    the current converter outputs a current pulse in response to receipt of the precision voltage from the drive pulse generator;
    where the circuit is incorporated into a differential variable resistance transducer, and the drive pulse generator comprises a current pump, and the differential variable resistance transducer includes a pair of counterwound windings connected by a center tap, and each winding is separately powered by a separate current pump.

2. The sensor of claim 1, wherein the temperature of the sensor is not monitored.

3. The sensor of claim 1, wherein the circuit is incorporated into a single ended variable reluctance transducer.

4. The sensor of claim 1, wherein the drive pulse generator comprises a first constant current driver and a second constant current driver, wherein the output of the first and second current drivers are 180 degrees out of phase with each other.

5. The sensor of claim 1, wherein the drive pulse generator comprises a first constant current driver connected to a first of the pair of counterwound windings and a second constant current driver connected to the second of the pair of counterwound windings.

6. The sensor of claim 5, wherein the output of the first and second current drivers are 180 degrees out of phase with each other.

7. A sensor which is sensitive to the position of a magnetic core or metal target in proximity to a winding, comprising:
    a circuit for measuring the position of said magnetic core or metal target, the circuit comprising a drive pulse generator which generates a precision voltage to a current converter, the current converter configured to output a current pulse in response to receipt of the precision voltage from the drive pulse generator;
    wherein the circuit is incorporated into a variable resistance transducer, and the drive pulse generator comprises at least one current pump, and the variable resistance transducer includes at least one winding powered by the at least one current pump.

8. The sensor of claim 7, wherein the variable resistance transducer is one of a differential variable resistance transducer or a linear variable resistance transducer.

9. The sensor of claim 8, wherein the at least one current pump comprises a first current pump and a second current pump.

10. The sensor of claim 9, wherein the variable resistance transducer comprises two windings and a center tap therebetween.

11. The sensor of claim 10, wherein the phase of the pulse of the first current pump is 180 degrees from the phase of the output of the second current pump.

12. The sensor of claim 11, wherein the variable resistance transducer further comprises a third winding;
    the center tap is connected to electrical ground, one end of the third winding is connected to the output of the first current pump and a second end thereof is connected to electrical ground;
    an end of the first winding distal from the center tap is connected to the output of the first current pump and an end of the second winding distal from the center tap is connected to the output of the second current pump.

13. The sensor of claim 11, wherein;
the center tap is connected to electrical ground, and;
an end of the first winding distal from the center tap is connected to the output of the first current pump and an end of the second winding distal from the center tap is connected to the output of the second current pump.

14. The sensor of claim 8, further comprising track and hold amplifier electrically disposed between the variable displacement transducer and the at least one current pump.

* * * * *